United States Patent [19]

Wakahara

[11] Patent Number: 5,188,570
[45] Date of Patent: Feb. 23, 1993

[54] AUTOMATIC TRANSMISSION HAVING HYDRAULIC SERVO DEVICE FOR BAND BRAKE

[75] Inventor: Tatsuo Wakahara, Kanagawa, Japan

[73] Assignee: Nissan Motor Co., Ltd., Yokohama, Japan

[21] Appl. No.: 820,337

[22] Filed: Jan. 14, 1992

[30] Foreign Application Priority Data

Jan. 29, 1991 [JP] Japan .................................. 3-28049

[51] Int. Cl.⁵ .............................................. F16H 3/44
[52] U.S. Cl. ...................................... 475/143; 475/146; 188/77 R
[58] Field of Search ............................... 475/143, 146

[56] References Cited

U.S. PATENT DOCUMENTS

| | | | |
|---|---|---|---|
| 2,890,603 | 6/1959 | Harris et al. ............... | 475/146 X |
| 2,901,888 | 9/1959 | Swift ........................... | 188/77 R |
| 3,538,791 | 11/1970 | Asano et al. ............... | 475/143 X |
| 4,224,837 | 9/1980 | Croswhite ................... | 475/146 X |

FOREIGN PATENT DOCUMENTS 63-251652 10/1988 Japan .

Primary Examiner—Dirk Wright
Attorney, Agent, or Firm—Foley & Lardner

[57] ABSTRACT

An automatic transmission has a low clutch and a band brake. The band brake is actuated by a hydraulic servo device. In order to establish well timed operations of the low clutch and the band brake upon shifting from third gear to fourth gear, both the release of the low clutch and engagement of the band brake are effected by discharging a hydraulic pressure through a common oil passage from the low clutch and one of the oil chambers of the servo device.

16 Claims, 3 Drawing Sheets

FIG.3

| | C18 | C20 | C22 | B28 | B26 | OWC 29 | GEAR RATIO | $\alpha_1 = 0.440$<br>$\alpha_2 = 0.493$ |
|---|---|---|---|---|---|---|---|---|
| 1'ST SPEED | | | ○ | | (○) | ○ | $\dfrac{1+\alpha_2}{\alpha_2}$ | 3.027 |
| 2'ND SPEED | | ○ | ○ | ○ | | | $\dfrac{\alpha_1+\alpha_2+\alpha_1\alpha_2}{\alpha_2(1+\alpha_1)}$ | 1.619 |
| 3'RD SPEED | | ○ | ○ | | | | 1 | 1.000 |
| 4'TH SPEED | | | | ○ | | | $\dfrac{1}{1+\alpha_1}$ | 0.694 |
| REVERSE | ○ | | | | ○ | | $-\dfrac{1}{\alpha_1}$ | -2.272 |

(○) ENGAGED UNDER ENGINE BRAKING

AUTOMATIC TRANSMISSION HAVING HYDRAULIC SERVO DEVICE FOR BAND BRAKE

BACKGROUND OF THE INVENTION

1. Field of the Invention

The present invention relates to automatic transmissions of a type having a hydraulically operated friction element and a hydraulically operated band brake, and more particularly to automatic transmissions of a type having a hydraulic servo device for the band brake.

2. Description of the Prior Art

In order to clarify the task of the present invention, a conventional automatic transmission having a hydraulic servo device for a band brake will be briefly described in the following, which is disclosed in Japanese Patent First Provisional Publication No. 63-251652.

A band brake is employed in the disclosed transmission, which is released when the transmission assumes first or third gear and applied when the transmission assumes second or fourth gear. For selectively releasing and applying the band brake, a hydraulic servo device is employed, which uses two pistons. One piston is used for applying the band brake for second gear and the other piston is used for applying the band brake for fourth gear. That is, when the piston for second gear is applied at one surface thereof with a certain hydraulic pressure, the band brake is applied to establish second gear. When shifting from second gear to third gear is desired, the piston for second gear is applied at the other surface thereof with a certain hydraulic pressure (viz., band brake releasing pressure) with the pressure for second gear kept applied to the one surface of the piston. In this manner the band brake is released. When shifting from third gear to fourth gear is desired, the piston for fourth gear, which can operate independently of the piston for second gear, is applied with a hydraulic pressure to apply the band brake. Thus, by applying a hydraulic pressure to these two pistons in the above-mentioned manner, shifting from second to third gear and from third to fourth gear is carried out.

However, when the above-mentioned type servo device is applied to automatic transmissions of a type which, for achieving for example light weight and compact construction, has no forward one-way clutch, it becomes very difficult to adjust the gear shift timing from third to fourth gear.

In the automatic transmission disclosed by the above-mentioned publication, a forward one-way clutch is employed, which is engaged in forward gears other than fourth gear. That is, when, with a low clutch (which is engaged in first, second or third gear) kept engaged, a hydraulic pressure for fourth gear is applied to the servo device, the band brake is applied and thus fourth gear is established in the transmission.

However, in a transmission having no forward one-way clutch, it is necessary to release the low clutch when shifting from third to fourth gear. That is, when shifting from third to fourth gear, release of the low clutch and engagement of the band brake are both necessary. In other words, both "discharging" of a hydraulic pressure from the low clutch and "applying" of a hydraulic pressure to one piston for the band brake must be carried out in a well timed manner. However, as is known, under such a condition, it is very difficult to obtain well timed operations of the low clutch and the band brake (viz., piston).

SUMMARY OF THE INVENTION

It is therefore an object of the present invention to provide an apparatus by which the above-mentioned drawback is solved.

According to a first aspect of the invention, there is provided an automatic transmission which comprises a hydraulically operated friction element which assumes a released condition when, due to shifting to a given gear, a hydraulic pressure is released from a hydraulically working chamber of the friction element; a hydraulically operated band brake; a hydraulic servo device for actuating the band brake, the servo device including: a body; a servo piston axially slidably disposed in a bore formed in the body, the piston applying the band brake when moved in a first direction but releasing the band brake when moved in a second direction; first means defining in the bore oil chambers which are incorporated with the servo piston to move the same, the oil chambers being so arranged that when a hydraulic pressure is released from a given one of the oil chambers, the servo piston is moved in the first direction; and second means for providing a fluid communication between the given oil chamber and the hydraulically working chamber of the friction element.

According to a second aspect of the present invention, there is provided an automatic transmission which comprises a hydraulically operated friction element which is applied when the transmission assumes one of N, N+1 and N+2 gears and released when the transmission assumes an N+3 gear; a hydraulically operated band brake which is released when the transmission assumes one of N and N+2 gears and applied when the transmission assumes one of N+1 and N+3 gears; a hydraulic servo device for actuating the band brake, which includes: an axially movable servo piston, the piston having axially spaced larger and smaller diameter piston parts, the piston applying the band brake when moved in a first direction and releasing the the band brake when moved in a second direction; a body having therein a stepped cylindrical bore in which the servo piston is axially slidably disposed in a manner to define first, second and third oil chambers, the first oil chamber being a chamber to which an outside surface of the larger diameter piston part is exposed, the second oil chamber being a chamber to which inside surfaces of both the larger and smaller diameter piston parts are exposed, and the third oil chamber being a chamber to which an outside surface of the smaller diameter piston part is exposed; and first means for releasing a hydraulic pressure from the first oil chamber when the transmission assumes N gear and applying a hydraulic pressure to the same when the transmission assumes one of the N+1, N+2 and N+3 gears; second means for applying a hydraulic pressure to the second oil chamber when the transmission assumes one of N, N+1 and N+2 gears and releasing a hydraulic pressure from the same when the transmission assumes N+3 gear, the second means being connected to the friction element; and third means for releasing a hydraulic pressure from the third oil chamber when the transmission assumes one of N and N+1 gears and applying a hydraulic pressure to the same when the transmission assumes one of N+2 and N+3 gears.

BRIEF DESCRIPTION OF THE DRAWINGS

Other objects and advantages of the present invention will become apparent from the following description when taken in conjunction with the accompanying drawings, in which:

FIG. 3 is a table showing ON-OFF conditions of various friction elements of the automatic transmission in each gear.

DETAILED DESCRIPTION OF THE INVENTION

In the following, the invention will be described with reference to the accompanying drawings.

Figure 2:
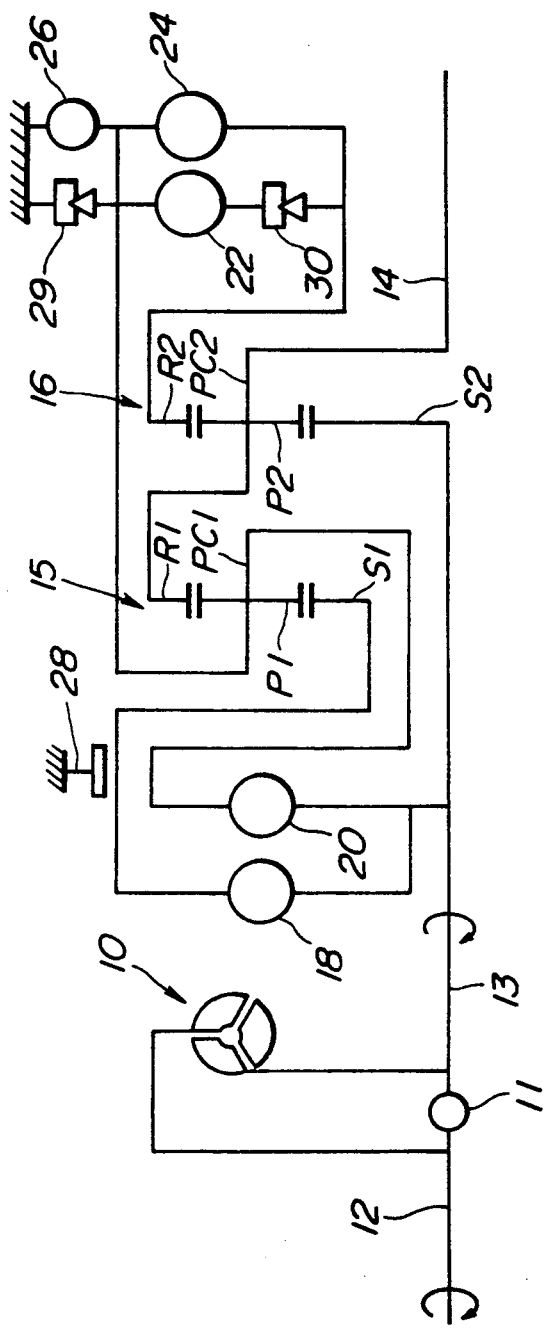
FIG. 2 is a drawing schematically showing the automatic transmission to which the hydraulic servo device of FIG. 1 is applied.

Referring to FIG. 2, there is schematically shown an automotive automatic transmission of a type having an overdrive, four forward speeds and a reverse, to which the invention is applied.

The transmission comprises an input shaft 13 to which a torque of an engine output shaft 12 is transmitted through a torque converter 10. Designated by numeral 14 is an output shaft of the transmission through which a driving force is fed to a final drive device (not shown). Between the input and output shafts 13 and 14, there are disposed, in the illustrated manner, a first planetary gear unit 15, a second planetary gear unit 16, a reverse clutch 18, a high clutch 20, a low clutch 22, a low-and-reverse brake 26, a band brake 28, and a low one-way clutch 29.

The torque converter 10 has a lock-up clutch 11 operatively installed therein.

The first planetary gear unit 15 comprises a sun gear S1, an internal gear R1, pinion gears P1 each meshing with both the sun gear S1 and the internal gear R1, and a pinion gear carrier PC1 carrying the pinion gears P1.

The pinion gear carrier PC1 is connectable to the input shaft 13 through the high clutch 20, and the sun gear S1 is connectable to the input shaft 13 through the reverse clutch 18.

The second planetary gear unit 16 comprises a sun gear S2, an internal gear R2, pinion gears P2 each meshing with both the sun gear S2 and the internal gear R2, and a pinion gear carrier PC2 carrying the pinion gears P2.

The pinion gear carrier PC1 of the first planetary gear unit 15 is connectable to the internal gear R2 of the second planetary gear unit 16 through the low clutch 22.

The sun gear S2 of the second planetary gear unit 16 is constantly connected with the input shaft 13, and the internal gear R1 of the first planetary gear unit 15 and the pinion gear carrier PC2 of the second planetary gear unit 16 are constantly connected with the output shaft 14.

The low-and-reverse brake 26 can fix the pinion gear carrier PC1 of the first planetary gear unit 15 and the band brake 28 can fix the sun gear S1 of the first planetary gear unit 15.

The low one-way clutch 29 is so arranged as to permit only a normal rotation (viz., the rotation in the same direction as the engine output shaft 12) of the pinion gear carrier PC1 of the first planetary gear unit 15. That is, a reversed rotation of the pinion gear carrier PC1 is suppressed by the clutch 29.

By selectively engaging and disengaging the clutches 18, 20, 22 and 29 and the brakes 26 and 28 in various combinations, the elements (viz., S1, S2, R1, R2, PC1 and PC2) of the first and second planetary gear units 15 and 16 are forced to change their operating conditions. With this changing, the ratio of rotation speed of the output shaft 14 relative to that of the input shaft 13 can be variously changed.

FIG. 3 is a table showing the various gears or speeds (viz., first, second, third and fourth forward speeds and a reverse) of the transmission which are given by ON/OFF conditions of the clutches 18, 20, 22 and 29 and the brakes 26 and 28.

In the table, the mark "O" means "ON" or engaged condition of the associated clutch or brake and "blank" means "OFF" or disengaged condition of the same. The mark "(O)" means engaged condition of an associated clutch or brake. However, this engaged condition does not participate in power transmission in the established speed. It is to be noted that "α1" and "α2" are ratios of the number of teeth of the sun gears S1 and S2 relative to that of the internal gears R1 and R2, respectively, and the "GEAR RATIO" is the ratio of the rotation speed of the input shaft 13 relative to that of the output shaft 14.

Figure 1:
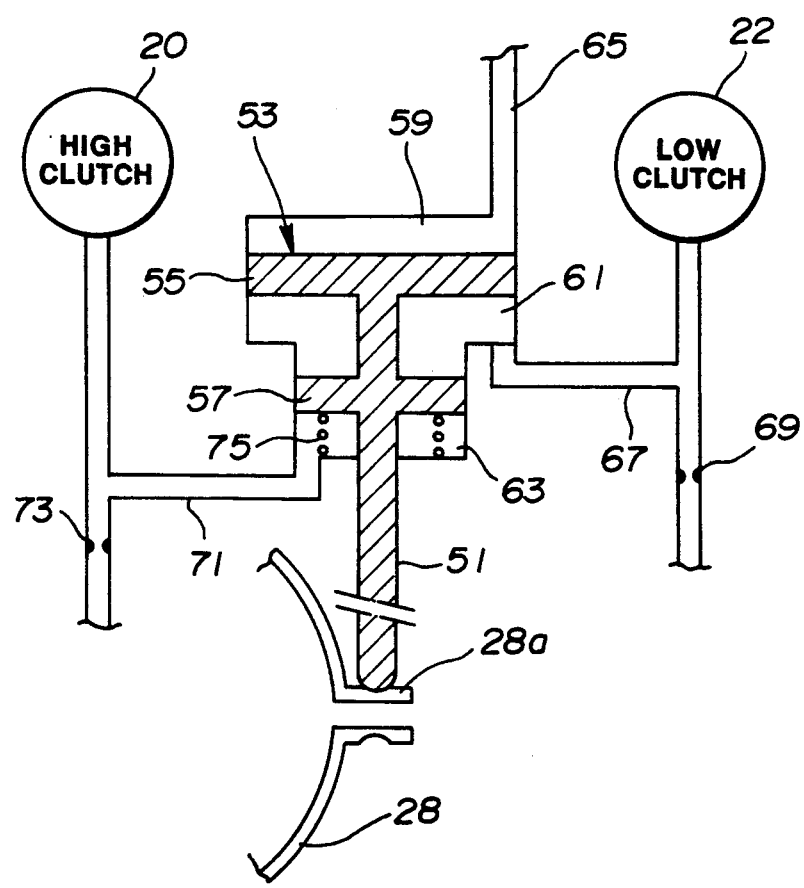
FIG. 1 is a drawing schematically showing a hydraulic servo device for a band brake installed in an automatic transmission according to the present invention.

The hydraulic servo device for the band brake 28 is shown in detail in FIG. 1. Designated by numeral 51 is a stem of a servo piston 53, whose leading end can push a work lug 28a of the band brake 28 to apply the band brake 28.

The servo piston 53 comprises a larger diameter piston part 55 and a smaller diameter piston part 57 which are coaxially disposed on spaced portions of the stem. The larger diameter piston part 55 is located behind the smaller diameter piston part 57 with respect to the band brake 28, as shown.

The servo piston 53 is axially movably disposed in a stepped cylindrical bore (no numeral) defined in a body. With this disposition, there are defined first, second and third oil chambers 59, 61 and 63 in the body. As shown, the first oil chamber 59 is the chamber to which an outside surface of the larger diameter piston part 55 is exposed, the second oil chamber 61 is the chamber to which both inside surfaces of the larger and smaller piston parts are exposed, and the third oil chamber 63 is the chamber to which an outside surface of the smaller diameter piston part is exposed.

Thus, when only the first oil chamber 59 is fed with a certain hydraulic pressure, the servo piston 53 is moved in a direction to apply the band brake 28. When only the second oil chamber 61 is fed with a certain hydraulic pressure, the servo piston 53 is forced to move in a direction to release the band brake 28 because of the differential area between the larger and smaller diameter piston parts 55 and 57. Furthermore, when only the third oil chamber 63 is fed with a certain hydraulic pressure, the servo piston 53 is moved in a direction to release the band brake 28.

A coil spring 75 is disposed in the third oil chamber 63 to bias the servo piston 53 in the direction to release the band brake 28.

The first oil chamber 59 has a first oil passage 65 connected thereto. When the transmission assumes second gear, third gear or fourth gear, a certain hydraulic pressure is applied to the first oil chamber 59 through the first oil passage 65.

The second oil chamber 61 has a second oil passage 67 connected thereto. The second oil passage 67 leads to a hydraulically working chamber of the low clutch 22. The second oil passage 67 has, at a portion upstream of the second oil chamber 61 and the low clutch 22, an orifice 69 disposed therein.

The third oil chamber 63 has a third oil passage 71 connected thereto. The third oil passage 71 leads to a hydraulically working chamber of the high clutch 20. The third oil passage 71 has, at a portion upstream of the third oil chamber 63 and the high clutch 20, an orifice 73 disposed therein.

In the following, operation of the servo piston 53 will be described.

When in the first gear of the transmission, only the second oil chamber 61 is applied with a hydraulic pressure, and thus, the servo piston 53 assumes its inoperative position releasing the band brake 28. In this condition, the low clutch 22 is applied.

When shifting from first gear to second gear is desired, a hydraulic pressure is applied to the first oil chamber 59 through the first oil passage 65. Then, the servo piston 53 is forced to move in a direction to apply the band brake 28 against the counter-force developed in the second oil chamber 61. This movement of the servo piston 53 is caused by the difference in effective area between the outside and inside surfaces of the larger diameter piston part 55. Thus, second gear is established in the transmission.

When then shifting from second gear to third gear is desired, a hydraulic pressure is applied to the third oil chamber 63 through the third oil passage 71, and to the high clutch 20. Under such a condition, the sum of counter-forces provided by the second and third oil chambers 61 and 63 is equal to the force provided by the first oil chamber 59, and thus the force of the coil spring 75 moves the servo piston 53 in a direction to release the band brake 28. Thus, third gear is established.

When shifting from second gear to third gear, hydraulic pressure is applied to the third oil chamber 63 and the high clutch 20 through the common oil passage 71 in which the orifice 73 is installed. With the provision of the orifice 73, the charging flow of oil is appropriately controlled, and thus, the increase in hydraulic pressure in the high clutch 20 (viz., engagement of the high clutch 20) and feeding of hydraulic pressure into the third oil chamber 63 (viz., the release of the band brake 28) are well timed.

When then shifting from third gear to fourth gear is desired, hydraulic pressure in the second oil chamber 61 is discharged through the second oil passage 67. Then, the servo piston 53 is forced to move in the direction to apply the band brake 28, and at the same time, the low clutch 22 is released. Thus, fourth gear is established in the transmission.

When shifting from third gear to fourth gear, oil in the low clutch 22 and oil in the second oil chamber 61 are discharged through the orifice-installed common oil passage 67. With the provision of the orifice 69, the discharging flow of oil is appropriately controlled, and thus, the reduction in hydraulic pressure in the hydraulically working chamber of the low clutch 22 (viz., the release of the low clutch 22) and discharging of a hydraulic pressure from the second oil chamber 61 (viz., engagement of the band brake 28) are well timed.

What is claimed is:

1. An automatic transmission comprising: a low clutch which assumes a released condition when, due to shifting to a given gear, a hydraulic pressure is released from a hydraulically working chamber of said low clutch;
a hydraulically operated band brake;
a hydraulic servo device for actuating said band brake, said servo device including:
a body;
a servo piston axially slidably disposed in a bore formed in said body, said piston applying said band brake when moved in a first direction but releasing said band brake when moved in a second direction;
first means for defining in said bore oil chambers which are incorporated with said servo piston to move the same, said oil chambers being so arranged that when a hydraulic pressure is released from a given one of the oil chambers, said servo piston is moved in said first direction; and
second means for providing a fluid communication between the given oil chamber and said hydraulically working chamber of said low clutch.

2. An automatic transmission as claimed in claim 1, further comprising a high clutch whose hydraulically working chamber is fluidly connected to one of said oil chambers other than the given oil chamber.

3. An automatic transmission as claimed in claim 2, further comprising a spring which biases said servo piston in said second direction.

4. An automatic transmission as claimed in claim 3, in which an orifice is disposed in an oil passage whose downstream end is fluidly connected to both said given oil chamber and said hydraulically working chamber of said low clutch.

5. An automatic transmission as claimed in claim 4, in which another orifice is disposed in another oil passage whose downstream end is fluidly connected to both said hydraulically working chamber of said high clutch and said one of said oil chambers other than said given oil chamber.

6. An automatic transmission comprising:
a hydraulically operated friction element which is applied when the transmission assumes one of N, N+1 and N+2 gears and released when the transmission assumes N+3 gear;
a hydraulically operated band brake which is released when the transmission assumes one of N and N+2 gears and applied when the transmission assumes one of N+1 and N+3 gears;
a hydraulic servo device for actuating said band brake, which includes:
an axially movable servo piston, said piston having axially spaced larger and smaller diameter piston parts, said piston applying said band brake when moved in a first direction and releasing said band brake when moved in a second direction;
a body having therein a stepped cylindrical bore in which said servo piston is axially slidably disposed in a manner to define first, second and third oil chambers, said first oil chamber being a chamber to which an outside surface of the larger diameter piston part is exposed, said second oil chamber being a chamber to which inside surfaces of both said larger and smaller diameter piston parts are exposed, and said third oil chamber being a chamber to which an outside surface of said smaller diameter piston part is exposed; and
first means for releasing a hydraulic pressure from said first oil chamber when the transmission assumes N gear and applying a hydraulic pressure to the same when the transmission assumes one of the N+1, N+2 and N+3 gears;

second means for applying a hydraulic pressure to said second oil chamber when the transmission assumes one of N, N+1 and N+2 gears and releasing a hydraulic pressure from the same when the transmission assumes N+3 gear, said second means being connected to said friction element; and third means for releasing a hydraulic pressure from said third oil chamber when the transmission assumes one of N and N+1 gears and applying a hydraulic pressure to the same when the transmission assumes one of N+2 and N+3 gears.

7. A hydraulic servo device as claimed in claim 6, in which said servo piston is so arranged as to move in said first direction when said first and third oil chambers are applied with a hydraulic pressure and said second oil chamber is released from a hydraulic pressure.

8. A hydraulic servo device as claimed in claim 7, in which said hydraulically operated friction element is a low clutch.

9. A hydraulic servo device as claimed in claim 8, further comprising a high clutch whose hydraulically working chamber is fluidly connected to said third oil chamber.

10. A hydraulic servo device as claimed in claim 9, further comprising a coil spring which is compressed in said third coil chamber to bias said servo piston in said second direction.

11. A hydraulic servo device as claimed in claim 10, in which an orifice is disposed in an oil passage formed in said body, said oil passage having a downstream end to which both said second oil chamber and a hydraulically working chamber of said low clutch are fluidly connected.

12. An automatic transmission as claimed in claim 11, in which another orifice is disposed in another oil passage formed in said body, said another oil passage having a downstream end to which both said third oil chamber and said hydraulically working chamber of said high clutch are fluidly connected.

13. An automatic transmission comprising:
a low clutch having a hydraulically working chamber;
a high clutch having a hydraulically working chamber;
a hydraulically operated band brake; and
a hydraulic servo device for actuating said band brake, said servo device including:
a body;
means for defining in said body a bore;
a servo piston axially slidably disposed in said bore in a manner to divide said bore into first, second and third oil chambers, said servo piston applying said band brake when moved in a first direction and releasing said band brake when moved in a second direction, said first oil chamber producing a force to urge said servo piston in said first direction when fed with a hydraulic pressure, each of said second and third oil chambers producing a force to urge said servo piston in said second direction when fed with a hydraulic pressure;
means for providing a fluid communication between said hydraulically working chamber of said low clutch and said second oil chamber; and
means for providing a fluid communication between said hydraulically working chamber of said high clutch and said third oil chamber.

14. An automatic transmission as claimed in claim 13, further comprising a spring which biases said servo piston in said second direction.

15. An automatic transmission as claimed in claim 14, further comprising:
an orifice which is disposed in an oil passage whose downstream end is fluidly connected to both said hydraulically working chamber of said low clutch and said second oil chamber; and
another orifice which is disposed in another oil passage whose downstream end is fluidly connected to both said hydraulically working chamber of said high clutch and said third oil chamber.

16. An automatic transmission as claimed in claim 14, in which said second oil chamber is positioned between said first and third oil chambers and said spring is operatively disposed in said third oil chamber.

* * * * *